Feb. 2, 1965  T. B. HARPER  3,168,342
KNOTTER MECHANISMS
Filed Jan. 28, 1963  4 Sheets-Sheet 1
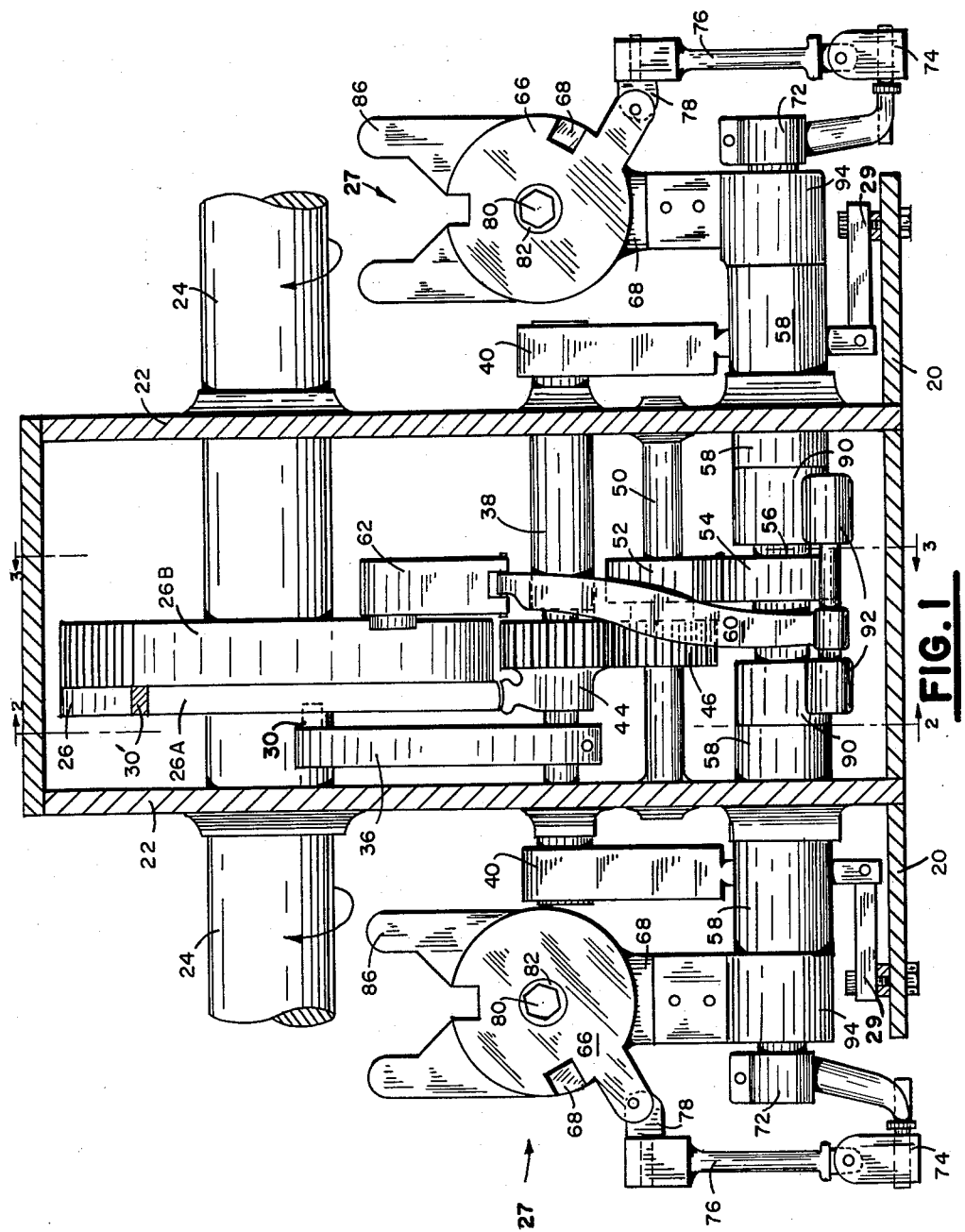
INVENTOR.
TOBY B. HARPER
BY
*Head & Johnson*
ATTORNEYS

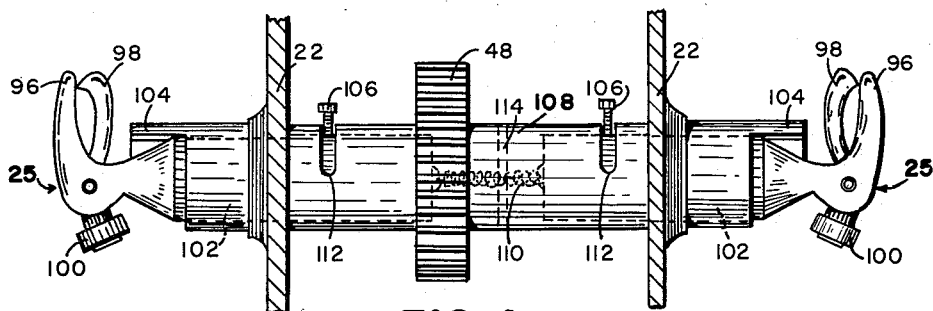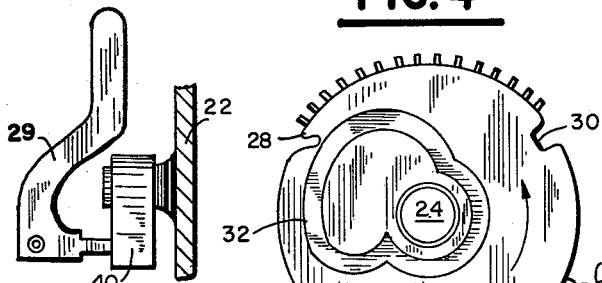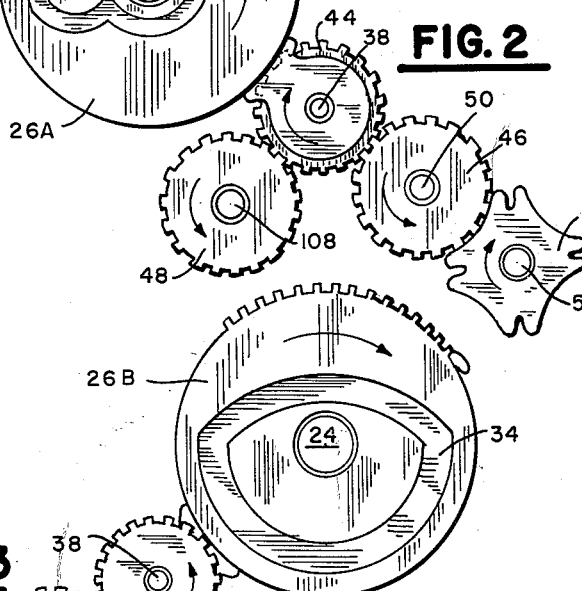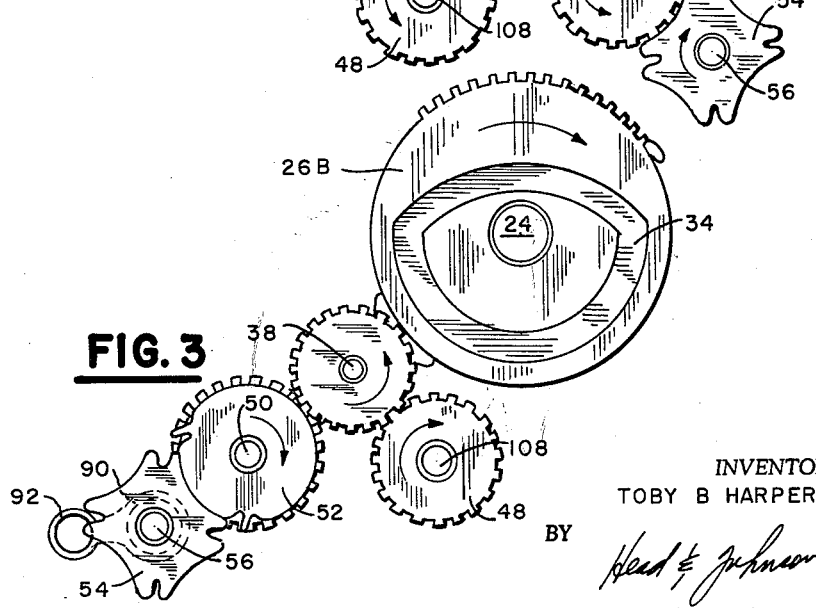

Feb. 2, 1965    T. B. HARPER    3,168,342
KNOTTER MECHANISMS
Filed Jan. 28, 1963    4 Sheets-Sheet 3

INVENTOR.
TOBY B. HARPER
BY Head & Johnson
ATTORNEYS

Feb. 2, 1965 T. B. HARPER 3,168,342
KNOTTER MECHANISMS
Filed Jan. 28, 1963 4 Sheets-Sheet 4

INVENTOR.
TOBY B. HARPER
BY
*Head & Johnson*
ATTORNEYS

_United States Patent Office_ 3,168,342
Patented Feb. 2, 1965

3,168,342
KNOTTER MECHANISMS
Toby B. Harper, Dolph, Ark.
Filed Jan. 28, 1963, Ser. No. 254,179
9 Claims. (Cl. 289—2)

This invention relates to a knotter mechanism for tying twine knots as used on automatic hay balers and the like.

Twine bales are becoming more popular in the agriculture industry because of the convenience and safety of twine as versus the wire type hay bales. The knot tying mechanisms presently used on hay balers have some disadvantages. First, the presently used knotter mechanisms tie the bale twine under tension. This causes the bill hook of the knotter to pull loose and break filaments of the twine where the knot is tied, causing a weak place where breakage is most likely to occur. Second, the present twine balers require the use of two separate knotting units which require more parts and more maintenance. This invention eliminates these and other problems.

The principal object of this invention is to provide a unitary knotting mechanism whereby bale twines are tied simultaneously.

Another object of this invention is to provide an improved twine holder for use with knotter mechanisms.

Another object of this invention is the provision of an improved knotter mechanism which requires no twine slippage while the knot is being tied, thus reducing damage to the twice where the knot is tied.

Another object of this invention is to provide an improved twine cutter for use with a knot tying mechanism to cut the twine at the end of each tying cycle.

Another object of this invention is to provide an improved knotter mechanism wherein a minimum of twine is wasted on the loose ends of the twine knot as tied by the mechanism.

A further object of this invention is to provide a knot tying mechanism which has compactness and simplicity and is economical to manufacture.

These and other objects and a better understanding of the invention may be had by referring to the following descriptions and claims taken in conjunction with the attached drawings in which:

FIGURE 1 is an end view of the knot tying mechanism.

FIGURE 2 is a sectional view taken along line 2—2 of FIGURE 1.

FIGURE 3 is a sectional view taken along line 3—3 of FIGURE 1.

FIGURE 4 is the end view of the bill hook assembly.

FIGURE 5 is the top view of the arm and twine finger.

_Description_

This invention relates to a knot tying mechanism for hay balers. More particularly, but not by the way of limitation, this invention relates to a twine knotter for hay balers comprising, in combination, a rotatably mounted power drive shaft driven by outside means, a bill hook shaft rotatably mounted parallel to and spaced from the power drive shaft, a first bill hook member affixed to one end of the bill hook shaft and a second bill hook member affixed to the opposite end of the bill hook shaft, a twine holder shaft rotatably mounted parallel to and spaced apart from the power drive shaft and the bill hook shaft, a first and a second pivotally mounted twine holder means spaced apart from each other, each of the twine holder means mounted adjacent to the bill hook members, means coupling the twine holders to the twine holder shaft, whereby the twine holders are actuated to grasp the twine by rotation of the twine holder shaft, a main intermittent gear affixed to the power drive shaft, and gear means driven by the main intermittent gear for rotation of the bill hook shaft and the twine holder shaft.

Figure 14:
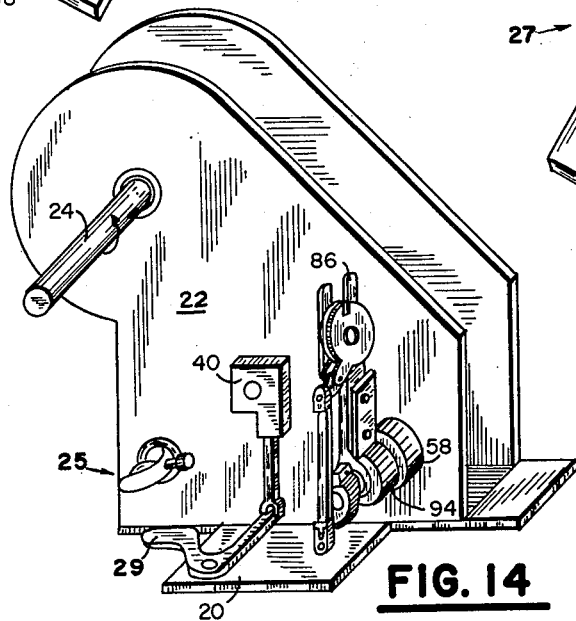
FIGURE 14 is a perspective view of the knot tying mechanism.

Referring to FIGURES 1 and 14 the knotter mechanism is mounted on a common base plate 20. Attached to the common base plate 20 is an enclosed box 22, which covers a gear assembly. This common base plate 20 can be and will be referred to as being mounted on a typical twine type hay baler. This invention will be described as it particularly applies to tying knots on twine type hay balers, however, it is to be understood that the methods and devices of this invention are equally adaptable to tying twine and cords for any application and in association with any type of equipment.

A power drive shaft 24 runs horizontally through the enclosed box 22. Affixed to the power drive shaft 24 is a main intermittent gear 26 which is composed of two parts 26(A) and 26(B). Section 26(A) is completely smooth except for a notch 28 and a groove 30′. The function of parts 26(A) and 26(B) will be described later. To start the tying process the twine baler needle arm 21 (see FIGURES 9 through 13) penetrates the compressed hay bale and travels on up to the knot tying mechanism. The twine baler needle arm 21 places the twine across the bill hook 25 (hidden in FIGURE 1 but shown in FIGURES 4 and 9 through 14) and on up to the slot in the twine holders generally indicated by the numeral 27. This process is done on both sides of the knot tying mechanism as this mechanism is designed to tie two strands of twine simultaneously but the preceding description will open refer to the procedure on one side of the tying mechanism.

At this time the main power drive shaft 24 begins its rotation thus starting the knot tying process. Affixed to the main power drive shaft 24 is the main intermittent gear 26 and as soon as rotation is started a twine finger 29 begins to push the twine across and out from the bill hook 25 by means of a rod and peg 30 for the twine finger 29 by the peg traveling in the cam groove 32, FIGURE 2. Referring back to FIGURE 1, the rod 36 and peg 30 for the twine finger can best be seen. The peg 30 is permanently fixed to the twine finger rod 36, and the peg moves freely in the cam groove 32 for actuation of the twine finger 29. The rod 36 is affixed to a twine finger shaft 38 which is parallel to the power drive shaft 24. The twine finger shaft 38 is rotatably mounted to the enclosed box 22 and on each end is fastened a twine finger arm 40 as shown in FIGURES 1, and 14. Attached to the twine finger arm by means of a pin is the twine finger 29 also seen in FIGURES 1 and 14.

The main cam gear 26 continues to travel with only the twine finger 29 moving until the notch 28 on the main cam gear engages with a sprocket starting gear 44, located on, but not fastened to the twine finger shaft 38. Starting gear 44 is a free spinning gear on the twine finger shaft 38. This can best be seen in FIGURE 1. The starting gear 44 is made up of a circular spur gear and a smooth gear with two sprockets. The view of this starting sprocket gear 44 is best seen in FIGURE 2.

Since the starting gear 44 is not secured to the twine finger shaft 38, it does not affect the twine finger arm 29, but spins freely about the twine finger shaft 38. The starting gear 44 meshes with a bill hook gear 48 and a spur gear 46, as seen in FIGURES 2 and 3. A spur gear 46 is fastened securely to spur gear shaft 50, the shaft riding freely on bearings in the enclosed box 22. Also affixed to the spur gear shaft 50 is a two tooth gear 52, FIGURE 3. Gear 52 rides flush against a sprocket gear 54. The sprocket gear 54 and the twine holder shaft 56 rotate only one-half of a cycle during a complete knot tying process.

Twine holder assembly

Figure 9:
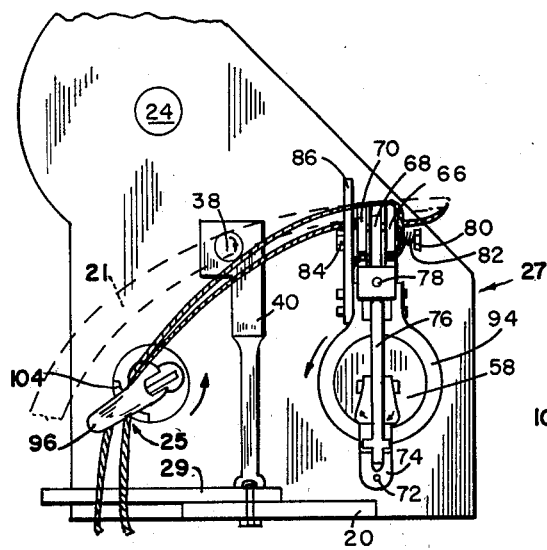
FIGURES 9 to 13 are side views of the knotter mechanism performing progressive steps in the formation of the twine knot with the position of the baler twine needle being shown by dotted lines.
Figure 10:
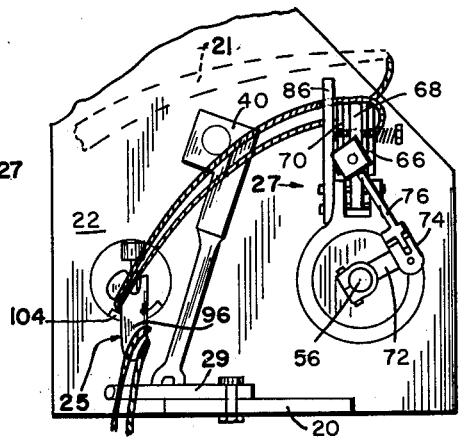
Figure 11:
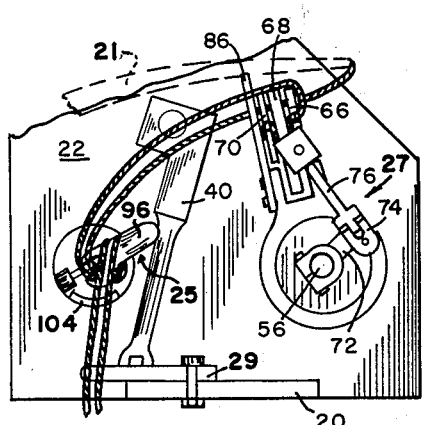
Figure 12:
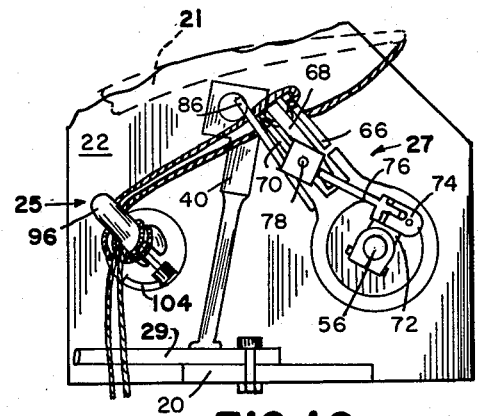

Referring to FIGURES 9–12, the twine baler needle arm 21 places the twine in the top notch of the twine holder discs 66, 68 and 70 and the first movement of the two tooth gear 52 actuates the sprocket gear 54 one-quarter of a turn which rotates a turning arm 72 on the ends of the twine holder shaft 56. The turning arm 72 rotates the movable twine holder discs 66 and 70 by means of a free moving universal connection 74, 76 and 78 which is composed of two universal joints 74 and 78 and a universal shaft 76. When the movable twine holder discs 66 and 70 are rotated to their half way position by a one-quarter turn of the twine holder shaft 56, the notches are closed and the twine is secured as seen in FIGURES 10, 11 and 12.

Figure 6:
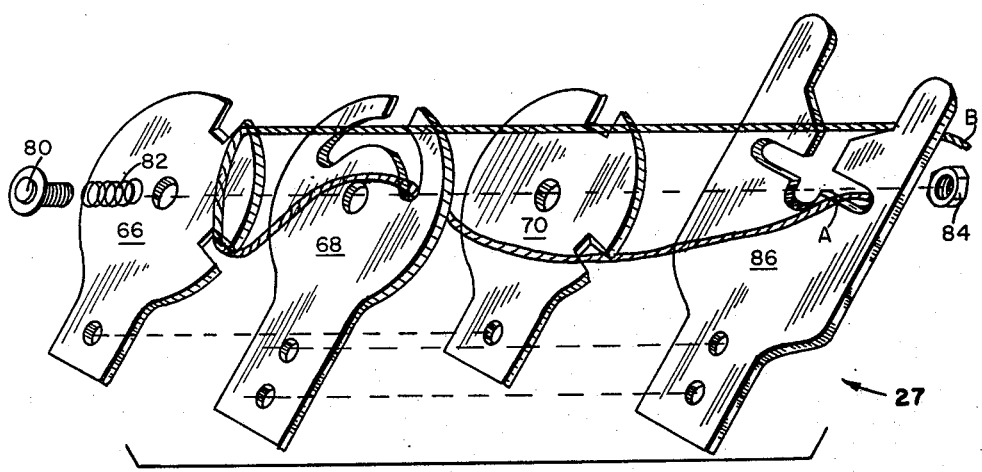
FIGURE 6 is a separated view of the three twine holder discs and twine cutter.

The movable twine holding discs 66 and 70 are held together by a bolt 80, spring 82 and nut 84 (see FIGURE 6). The spring places tension on the movable holder discs 66 and 70 and allows a sufficient variance for twine to pass between the holding discs 66, 68 and 70.

Referring especially to FIGURE 6, the location of the twine can be followed. Starting at end "A" of the twine, the end that was cut by the previous tying cycle, the twine travels through the notch on holding disc 70, then the twine goes up into and through the slot on the fixed holder disc 68, then back down through the notch on the movable holder disc 66, then up around the top part of the movable holder disc 66, across the top of the fixed holder disc 68, across the top of the movable holder disc 70 and, through the arms of the twine cutter 86. The twine end, "B" part, travels around the bale that has been compressed, back to the twine baler needle arm 21. The twine end "B" is always under tension due to the compression of the hay bale being formed, thus there is always tension being pulled across the holder discs, which in turn acts to hold the twine and prevent any twine slippage in the holder.

Figure 7:
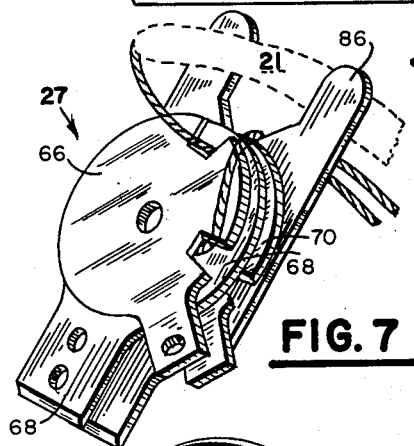
FIGURE 7 is a view of the assembled twine holder the twine being held in a lower position.
Figure 8:
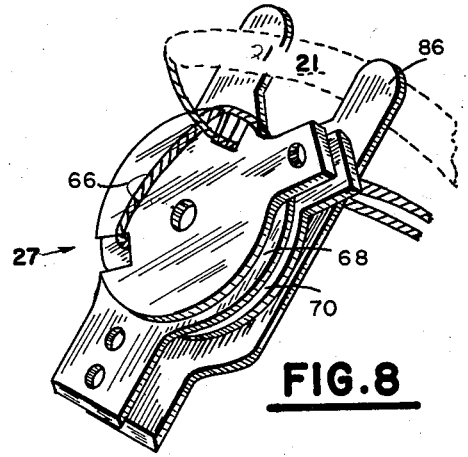
FIGURE 8 is a view of the assembled twine holder with twine being held in a top position.

Upon the last turn of the sprocket gear 54, the twine holder shaft 56, through the universal connections 72–78, turns the movable holder discs 66 and 70 to their final position, thus aligning the three notches on the twine holder discs 66, 68 and 70 and releasing the end of twine that was being held. Upon the next tying cycle, the holding action will be identically performed except the twine holding discs 66 and 67 will rotate in the opposite direction. These two described positions are seen in FIGURE 7 and FIGURE 8.

Twine holder and cutter assembly

After such movement by the twine holder discs 68 and 70 to securely fasten and hold the twine as previously explained, then at this time the twine cutter rod and peg arm 62 proceed in an upward movement by the peg moving in the cutter cam groove 34, FIGURES 1 and 3. Fastened jointly to the twine cutter rod and peg arm 62 by means of a pin or the like, is a connecting arm 60 connecting the twine cutter rod and peg arm 62 with the twine cutter shaft 58, by means of a clamp device 90 and clamp shaft 92 each of which is rigidly clamped to the twine cutter shaft 58. The connecting arm 60 rotates freely about the clamp shaft 92 moving the clamp shaft 92 up and down when actuated.

Figure 13:
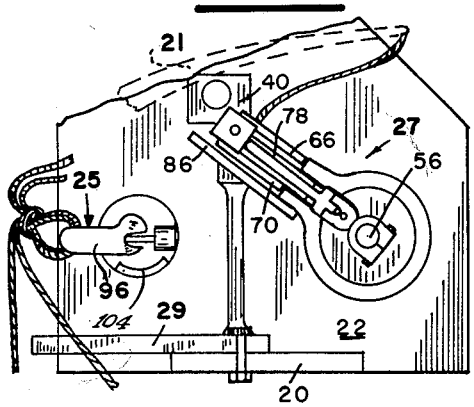
Figure 15:
FIGURE 15 is a view of the knot made by the knotter mechanism.

As the twine cutter rod and peg 62 proceed upward, this raises the connecting arm 60 and the clamp shaft 92, thus causing the twine cutter shaft 58 to rotate in the direction shown in FIGURES 1 and 14. Affixed securely to the ends of the twine cutting shaft 58 are the twine holder and cutter clamps 94 which securely hold the twine cutter 86 and the fixed twine holder disc 68. While the twine knot is being tied by the bill hook assembly 25, it requires extra twine which is furnished by the twine holder disc assembly 66, 68, 70 and 86 (generally indicated by the numeral 27) being rotated down toward the bill hook assembly 25. FIGURE 9 shows the starting position before rotation of the twine holder disc assembly. FIGURE 10 shows the start of the downward rotation and FIGURES 11 and 12 show two more positions of the holder assembly being rotated about the shaft 58. FIGURE 13 is the final position of the holder assembly and at this point the twine is cut by the twine cutter 86. The next step is the holder assembly moving back to its original position, FIGURE 9. The actual cut is made by the twine holding discs 66 and 70 rotating to their final position and at this time the twine is forced (see FIGURE 6) into either side of the notches on the twine cutter 86, depending on the direction of the twine holding discs 66 and 70 as to which notch is used. Upon the final locking point of the twine holding discs 66 and 70, FIGURES 7 and 8, and upon the final downward position of the twine holding assembly, FIGURE 13, the twine is forced to the extreme edge of the notch on the twine cutter 86 and thereupon cutting of the twine takes place.

Bill hook assembly

The bill hook, generally referred to as number 25, FIGURES 4 and 9–13, is the actual knot tying mechanism of this invention. The bill hook assembly is operated complete by the bill hook spur gear 48 that meshes with the starting gear 44 as above described. From FIGURE 4 it is seen that the bill hook gear 48 is rigidly attached to a bill hook drive shaft 108, which shaft 108 penetrates both sides of the enclosed box 22 and rides freely inside a fixed cam surface 104 on the outside of the enclosed box 22. Still referring especially to FIGURE 4, riding freely inside the bill hook drive shaft 108 is the bill hook intershaft 102 which is the shaft for the movable and fixed jaws 98 and 96 of the bill hook 25. The intershaft 102 is connected to the bill hook drive shaft 108 by means of a pin 106 which protrudes through a slot 112 in the drive shaft 108. The pin 106 allows a slight give or play in the rotation of the bill hook intershaft 102 only to the limit of the length of the slot 112. A spring 110 connected between the spring pin 114 and the bill hook intershaft 102 will rotate the intershaft 102 back to its original position after pressure or force is released from the movable and fixed jaws 98 and 96.

Operation

The knot tying process of this mechanism will be described step by step: (1) Referring to FIGURE 9, the twine finger 29 pushes the two strands of twine out away from the bill hook 25. The two strands of twine are now fastened to the twine holder discs 66, 68 and 70, from the holder the strands of twine run down and across the fixed jaw 96, under the movable jaw 98 (hidden in FIGURES 9 through 13), then out across the twine finger 29 and then they separate to go around the bale. (2) The bill hook spur gear 48 now actuated through the rotation of the main intermittent gear 26 and the starting gear 44 thus causing the fixed and movable jaws 96 and 98 to start rotation. The first quarter turn of the cycle the fixed jaw 96 rotates under the twine being pushed out by the twine finger 29, as seen in FIGURE 10. The twine now goes from the holder discs 66, 68 and 70 across the top of the fixed jaw 96, underneath the movable jaw 98 and then back up and over the side of the fixed jaw 96. (3) As the bill hook 25 reaches the half way point, the roller 100 comes in contact with the fixed cam surface 104, thus forcing the movable jaw 98 open. (4) Referring especially to FIGURE 11, as the bill hook 25 reaches the three quarter position with the movable jaw 98 still open, the twine strands from the holding discs 66, 68 and 70 go in between the fixed jaw 96 and the movable jaw 98. (5) After the bill hook 25 leaves the three-quarter position, the fixed cam surface 104 stops and the movable jaw 98, which is spring loaded, closes around the twine seen in FIGURE 12. (6) As the bill hook 25 reaches the original position, the holding disc assembly at this moment arrives at the fartherest point on its rotation arc, and the twine strand from the bale needle arm 21 is cut and the twine strand being held in the holder discs 66, 68 and 70 is released as seen in FIGURES 13. The pressure of the twine around the bale plus the fact of the bale being extracted from the baler, pulls the twine from the bill hook 25 and the knot is thus formed.

The invention has been described by reference to specific and preferred embodiments. It will be apparent, however, that many modifications can be made without departing from the spirit and scope of the invention. Accordingly, this invention should be construed not to be limited to the embodiment herein described but should be limited only by the scope of the appended claims.

What is claimed:

1. A twine knotter for hay balers comprising, in combination:
    a rotatably mounted power drive shaft driven by outside means;
    a bill hook shaft rotatably mounted parallel to and spaced from said power drive shaft;
    a first bill hook member affixed to one end of said bill hook shaft and a second bill hook member affixed to the opposite end of said bill hook shaft;
    a twine holder shaft rotatably mounted parallel to and spaced apart from said power drive shaft and said bill hook shaft;
    a first and a second pivotally mounted twine holder means spaced apart from each other, each of said twine holder means mounted adjacent of said bill hook members;
    means coupling said twine holders to said twine holder shaft, whereby the twine holders are actuated to grasp said twine by rotation of said twine holder shaft;
    a main intermittent gear affixed to said power drive shaft; and
    gear means driven by said main intermittent gear for rotation of said bill hook shaft and said twine holder shaft.

2. A twine knotter for hay balers according to claim 1 including a twine take-up shaft mounted parallel to and spaced from said power drive shaft and said bill hook shaft;
    a means coupling said twine holder members to said twine take-up shaft whereby said twine holder members are pivoted by the rotation of said twine take-up shaft; and
    gear means driven by said main intermittent gear for rotation of said twine take-up drive shaft.

3. A twine knotter for hay balers according to claim 1 wherein said twine holders each include a first and a second movable disc axially mounted to a fixed disc therebetween;
    said first and second movable discs are notched and aligned with a notched groove on said fixed disc; the said circular groove on said fixed disc receives the twine as said first and second movable discs rotate; and
    a means coupling said first and second movable discs to said twine holder shaft, whereby said first and second movable discs rotate due to the rotation of said twine holder shaft.

4. A twine knotter for hay balers according to claim 1 including a twine finger shaft rotatably mounted parallel to said power drive shaft;
    a first and a second twine finger pivotally mounted beneath said bill hooks, and attached one to each end of said twine finger shaft respectively; and
    a rotational means driven by a cam groove on the side of said main intermittent gear for rotation of said twine finger shaft.

5. A twine knotter for hay balers comprising in combination:
    a base;
    two upright frame panels supported by the said base;
    a main power drive shaft driven by outside means, journaled into and rotatably mounted and supported by said frame panels, horizontal to said base;
    a bill hook shaft rotatably supported by said frame panels and parallel to said power drive shaft;
    a first and a second bill hook member attached one to each end of said bill hook shaft on each side and next to said frame panels;
    a twine holder shaft rotatably mounted into said frame panels and parallel to said power drive shaft and said bill hook shaft;
    a first and a second twine holder member pivotally mounted on said frame panels each adjacently positioned to said bill hook members;
    a twine take-up shaft rotatably mounted into said frame panels and parallel to said power drive shaft;
    a means coupling said twine holder members to said twine take-up shaft whereby said twine holder members are pivoted by the rotation of said twine take-up shaft;
    a main intermittent gear affixed on said power drive shaft between said upright frame panels;
    a gear means meshing with said main intermittent gear for rotation of said bill hook shaft and said twine holder shaft between said upright frame panels; and
    a rotational means to rotate said take-up shaft driven by a cam groove on the side of said main intermittent gear.

6. A twine knotter for hay balers according to claim 5 wherein said twine holders each include a first and a second movable disc axially mounted to a fixed disc therebetween, said first and second movable discs are notched and aligned with a notched groove on said fixed disc, the said groove on said fixed disc receives and holds the twine as said first and second movable discs rotate.

7. A twine knotter for hay balers according to claim 5 including a means coupling said first and second movable discs to said twine holder shaft whereby said first and second movable discs intermittently rotate by the rotation of said twine holder shaft.

8. A twine knotter for hay balers according to claim 5 including a twine finger shaft rotatably mounted parallel to said power drive shaft;
    a first and second twine finger pivotally mounted to said base beneath said bill hooks and attached one to each end of said twine finger shaft respectively; and a rotational means driven by a cam groove on the side of said main intermittent gear for partial rotation of said twine finger shaft.

9. A twine knotter for hay balers according to claim 5 including said first and second bill hook members rotating inside said bill hook shaft, said first and second bill hook members are connected by resilient means to said bill hook shaft, a circular groove on said bill hook shaft receives a peg that restricts said bill hook members to a small arc.

References Cited in the file of this patent
UNITED STATES PATENTS
2,793,890     Smith _____ May 28, 1957